(12) United States Patent
Bono et al.

(10) Patent No.: US 10,289,690 B1
(45) Date of Patent: May 14, 2019

(54) ACCESSING FILE SYSTEM REPLICA DURING ONGOING REPLICATION OPERATIONS

(71) Applicant: EMC Corporation, Hopkinton, MA (US)

(72) Inventors: Jean-Pierre Bono, Westborough, MA (US); Himabindu Tummala, South Grafton, MA (US); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 1270 days.

(21) Appl. No.: 14/492,241

(22) Filed: Sep. 22, 2014

(51) Int. Cl.
*G06F 17/30* (2006.01)

(52) U.S. Cl.
CPC .............................. *G06F 17/30174* (2013.01)

(58) Field of Classification Search
None
See application file for complete search history.

(56) References Cited

U.S. PATENT DOCUMENTS

| | | | |
|---|---|---|---|
| 7,334,095 B1* | 2/2008 | Fair ....................... | G06F 3/0607 711/161 |
| 7,631,155 B1 | 12/2009 | Bono et al. | |
| 7,769,722 B1 | 8/2010 | Bergant et al. | |
| 8,020,037 B1* | 9/2011 | Schwartz ............ | G06F 11/2094 714/41 |
| 8,364,648 B1* | 1/2013 | Sim-Tang ......... | G06F 17/30368 707/674 |
| 8,706,833 B1 | 4/2014 | Bergant et al. | |
| 9,286,007 B1 | 3/2016 | Bono | |
| 9,632,878 B1* | 4/2017 | Maccanti ............ | G06F 11/1469 |
| 2007/0185973 A1 | 8/2007 | Wayda et al. | |
| 2012/0243395 A1* | 9/2012 | Farey ....................... | G11B 5/86 369/84 |
| 2015/0309901 A1* | 10/2015 | Pershin ..................... | G06F 3/06 714/6.3 |
| 2017/0228417 A1* | 8/2017 | Maccanti .......... | G06F 17/30371 |

OTHER PUBLICATIONS

"EMC Celerra Replicator—Advanced IP Storage Protection", (PowerPoint Presentation), EMC Corporation, EMC Corporation, Hopkinton, MA, 2008, 27 pages.
"EMC RecoverPoint Family", (Data Sheet H2769), EMC Corporation, EMC Corporation, Hopkinton, MA, Aug. 2013, 6 pages.
"EMC VNX Snapshots", (White Paper), EMC Corporation, EMC Corporation, Hopkinton, MA, Dec. 2013, 57 pages.

* cited by examiner

*Primary Examiner* — Matthew J Ellis
(74) *Attorney, Agent, or Firm* — BainwoodHuang

(57) ABSTRACT

A technique for accessing replicas of file systems generates a snap (point-in-time version) of a replica on a destination site and provides access to the snap for reading and/or writing while replication operations on the replica between a source site and the destination site continue to be performed. As the snap is a separate object from the replica itself, users may access the snap without affecting the replica or disturbing ongoing replication activities. Users can also mount the snap to perform destination-driven backup operations, to test disaster recovery, and/or to perform other activities.

15 Claims, 11 Drawing Sheets

ACCESSING FILE SYSTEM REPLICA DURING ONGOING REPLICATION OPERATIONS

BACKGROUND

Data storage systems commonly employ continuous data protection (CDP), also known as "continuous replication," for protecting the data they store. Continuous replication operates on storage volumes, such as LUNs (Logical Unit Numbers), using Fibre Channel or iSCSI (Internet Small Computer System Interface), for example, to replicate data writes performed on storage volumes at a source to replicas of the storage volumes at a destination. Continuous replication generally allows administrators to restore data to any desired point in time.

Continuous replication may be performed synchronously or asynchronously. "Synchronous" replication proceeds in band with IO requests as the requests are processed at the source. The source typically sends data specified in the IO requests to the destination on an individual basis, e.g., one-by-one, as the source processes the IO requests. In contrast, "asynchronous" replication proceeds out of band with individual IO requests, with replicas updated, for example, on demand, at regular intervals, and/or in response to particular events.

A well-known solution for continuous replication is the RecoverPoint system available from EMC Corporation of Hopkinton, Mass. RecoverPoint systems include a replication splitter and one or more local replication appliances, at both a source data storage system and a destination data storage system. As the source processes IO requests that specify data to be written to a particular volume, the replication splitter at the source intercepts the IO requests and sends them to the local replication appliance. The replication appliance at the source communicates with the replication appliance at the destination, and the two appliances orchestrate the storage of the data specified in the IO requests at the destination. In this manner, the destination is made to store a current, or near-current, redundant copy of the volume, and the redundant copy may provide any-point-in-time recovery in the event of a failure at the source.

SUMMARY

Users often wish to make backups of data objects in addition to performing replication. Making backups is costly in terms of system resources, however, especially when data storage systems are already stressed in responding to IO requests and performing replication. We have recognized that destination sites may be better candidates than source sites for performing backups because they are often less fully utilized than source sites. Unfortunately, replicas on destination sites are not readily accessible, however, as the replicas are busy continually updating their content to reflect changes in data objects at the source.

In addition, users may wish to check procedures for disaster recovery. Such procedures may include testing whether replicas of data objects at destination sites can provide redundant access to contents of the data objects in the event of failures at source sites. As indicated above, however, replicas are not readily accessible while replication is ongoing.

In contrast with conventional data storage technology, which is not well-suited for destination-driven backup or disaster recovery testing on replicas, an improved technique generates a snap (point-in-time version) of a replica on a destination site and provides access to the snap for reading and/or writing while replication operations on the replica continue to be performed. As the snap is a separate object from the replica itself, users may access the snap without affecting the replica or disturbing ongoing replication activities. Users can also mount the snap to perform destination-driven backup operations, to test disaster recovery, and/or to perform other activities.

In some examples, the technique takes a new snap of the replica on a regular basis to provide new user-accessible versions of the replica as the replica changes to reflect changes in content at the source. In further examples, the technique accesses a transaction log for an object realized in the replica and in the snap. According to some variants, the destination applies pending transactions from the transaction log to the snap to bring the snap to a consistent state prior to exposing it to users. According to other variants, the source, rather than the destination, applies pending transactions from the transaction log to the original object and uses replication to mirror the pending transactions to the replica, such that the snap of the object reflects the consistent state of the original object.

Certain embodiments are directed to a method of accessing file system replicas. The method includes conducting replication operations on a file system hosted on a first data storage system repeatedly to update a replica of the file system on a second data storage system to reflect changes in the file system that occur in response to activities at the first data storage system over time. In a course of conducting the replication operations, the method further includes generating, by the second data storage system, a snap of the replica. The snap provides a point-in-time version of the replica of the file system. The method further includes, while the replication operations continue to update the replica, directing JO requests received by the second data storage system to the snap of the replica to effect read and/or write operations on the snap of the replica.

Other embodiments are directed to a system constructed and arranged to perform a method of accessing file system replicas. Still other embodiments are directed to a computer program product. The computer program product includes a set of non-transitory, computer-readable media having instructions which, when executed on one or more processors, cause the processors to perform a method of accessing file system replicas. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for accessing data from a replica during ongoing replication operations includes generating a snap (point-in-time version) of the replica on a destination site and providing access to the snap for reading and/or writing while replication operations on the replica continue to update the replica. Users can mount the snap to perform destination-driven backup operations, to test disaster recovery, and/or to perform other activities.

This document is presented in sections. In the material that follows:

Section I presents an example environment in which improved techniques hereof can be practiced. Section I describes, inter alia, a unified datapath architecture for expressing both block-based objects and file-based objects as respective underlying volumes and underlying files, which enables the use of a common replication approach for both block-based and file-based objects.

Section II presents particular example improvements for effecting synchronous and asynchronous replication of both block-based and file-based objects on a per-user-object basis under the direction of a common replication manager.

Section III presents particular improvements for accessing file system replicas during ongoing replication operations.

Embodiments claimed in the instant patent document are supported by all sections presented herein but especially by Section III.

Figure 1:
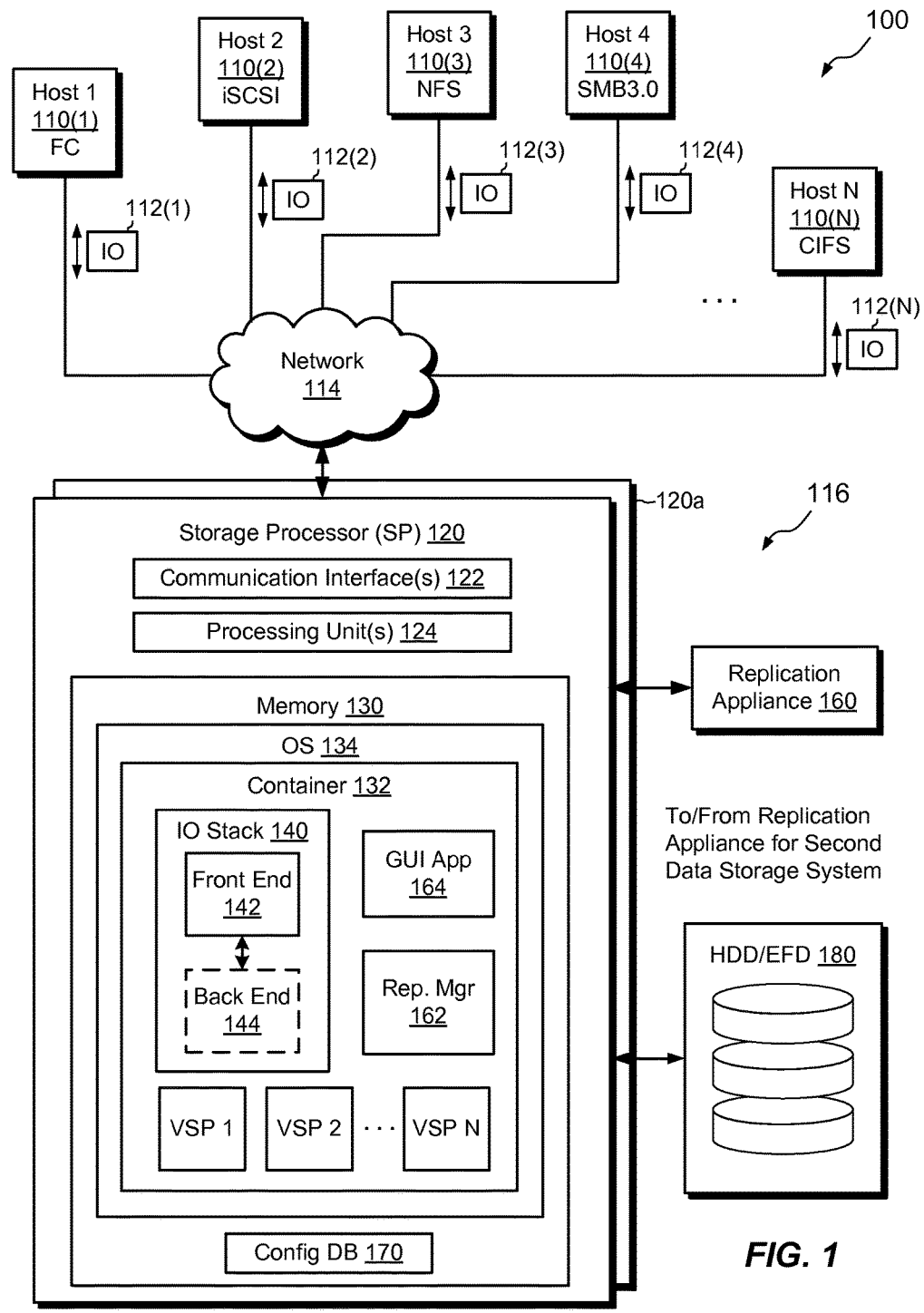
FIG. 1 is a block diagram showing an example environment in which improved techniques hereof can be practiced.

I) Example Environment Including Unified Datapath Architecture:

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The storage 180 is provided, for example, in the form of hard disk drives and/or electronic flash drives. The data storage system 116 may include multiple SPs like the SP 120 (see, for example, a second SP 120a). For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the host 110(1) can connect to the SP 120 using Fibre Channel (e.g., through a SAN). The hosts 110(2-N) can connect to the SP 120 using TCP/IP, to support, for example, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such 10 requests 112(1-N) by reading and/or writing the storage 180.

The SP 120 is seen to include one or more communication interfaces 122, a set of processing units 124, and memory 130. The communication interfaces 122 include, for example, adapters such as SCSI target adapters and network interface adapters for converting electronic and/or optical signals received from the network 114 to electronic form for use by the SP 120. The set of processing units 124 include one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives (SSDs), and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The memory 130 further includes a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can run on the same kernel (not shown) and can communicate with one another using inter-process communication (IPC) mediated by the kernel. Containers are well-known features of Unix, Linux, and other operating systems.

In the example of FIG. 1, only a single container 132 is shown. Running within the container 132 is an IO stack 140, a replication manager 162, a Graphical User Interface (GUI)-based application 164, and multiple VSPs (Virtualized Storage Processors) VSP 1 to VSP N. A VSP is a collection of data objects, internal file systems, and servers (e.g., NFS and/or CIFS servers), which together provide a mechanism for grouping objects and providing a common set of network interfaces such that the VSP appears from outside the SP 120 to be similar to a physical SP. Although certain components are shown residing within the container 132, different components alternatively reside in different containers. For example, the GUI-application 164 may run within a dedicated container and communicate with the replication manager 162 using IPC.

The IO stack 140 provides an execution path for host IOs (e.g., IO requests 112(1-N)) and includes a front end 142 and a back end 144. In alternative arrangements, the back end 144 is located on another SP (e.g., SP 120a) or is provided in a block-based array connected to the SP 120 (e.g., in a gateway configuration).

The replication appliance 160 assists in performing continuous replication to a second data storage system, which may be located locally to the data storage system 116 or remotely. In an example, the replication appliance 160 takes the form of a hardware unit, and multiple such units may be provided, e.g., in a clustered arrangement, such as for supporting strong data compression and other advanced features. For purposes of this document, the replication appliance 160 is referred to as a single component. It should be understood, however, that the replication appliance 160 may be implemented using any number of coordinating units.

The replication manager 162 controls the establishment of replication settings on specified data objects. The replication manager 162 establishes replication settings on a per-data-object basis, conducts replication sessions with replica sites, and orchestrates replication activities, including recovery and failover activities.

The GUI application 164 provides a user interface for configuring the replication manager 162, e.g., for establishing replication settings on particular data objects. As the IO stack 140, replication manager 162, and GUI application 164 all run within the same container 132, the IO stack 140, and replication manager 162 can communicate with one another using APIs (application program interfaces) and pointer passing and without the need to use IPC.

The memory 130 is further seen to include a configuration database 170. The configuration database 170 stores configuration information pertaining to the data storage system 116, including information about the VSPs 1-N and the data objects with which they are associated. In other implementations, the data storage system 116 stores the configuration database 170 elsewhere, such as or in the storage 180, on a disk drive of flash drive separate from the SP 120 but accessible to the SP 120, e.g., over a backplane or network, or in some other location.

In operation, the hosts 110(1-N) issue IO requests 112(1-N) to the data storage system 116. The IO requests 112(1-N) may include block-based requests and/or file-based requests. The SP 120 receives the IO requests 112(1-N) at the communication interfaces 122 and passes the IO requests to the IO stack 140 for further processing. At the front end 142, processing may include mapping IO requests directed to LUNs, host file systems, vVOLs (virtual volumes, available from VMWare Corporation of Palo Alto, Calif.), and other data objects to block-based requests presented to internal volumes, as well as mapping the internal volumes to respective files stored in a set of internal file systems of the data storage system 116. Host IO requests 112(1-N) received at the SP 120 for reading and writing block-based objects and file-based objects are thus converted to reads and writes of respective volumes, which are then converted to reads and writes of respective files. As will be described further below, the front end 142 may perform continuous replication at the level of the internal volumes, where both block-based objects and file-based objects are presented in block-based form. After processing by the front end 142, the IO requests propagate to the back end 144, where the back end 144 executes commands for reading and/or writing the physical storage 180, agnostically to whether the data read and/or written is directed to a block-based object or to a file-based object.

Figure 2:
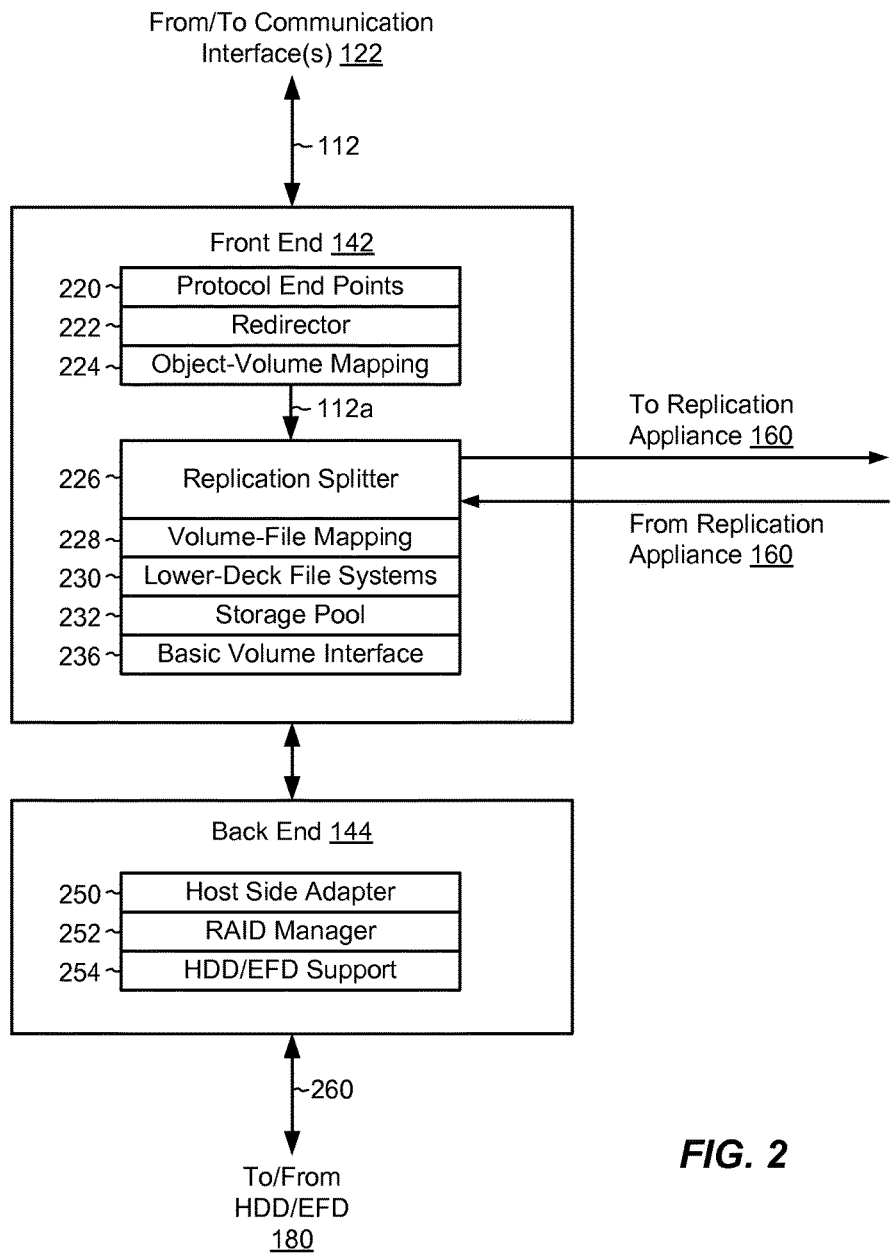
FIG. 2 is a block diagram showing an example IO stack of a storage processor of FIG. 1.

FIG. 2 shows the front end 142 and back end 144 of the IO stack 140 in additional detail. Here, the front end 142 is seen to include protocol end points 220, a redirector 222, an object-volume mapping layer 224, a replication splitter 226, a volume-file mapping 228, lower-deck (internal) file systems 230, a storage pool 232, and a basic volume interface 236. The back end 144 is seen to include a host side adapter 250, a RAID (Redundant Array of Independent Disks) manager 252, and hard disk drive/electronic flash drive support 254. Although IO requests 112 enter the IO stack 140 from the top and propagate down (from the perspective of FIG. 2), for ease of understanding, the different components of the IO stack 140 are described herein from the bottom up. It is understood that IO requests 112 are internal representations of the IO requests 112(1-N) as shown in FIG. 1.

At the back end 144, the hard disk drive/electronic flash drive support 254 includes drivers that perform the actual reading from and writing to the storage 180. The RAID manager 252 accesses particular storage units (slices) written or read using RAID protocols. The host side adapter 250 provides an interface to the front end 142, for instances in which the front end 142 and back end 144 are run on different machines. When the front end 142 and back end 144 are co-located on the same SP, as they are in FIG. 1, the host side adapter 250 may be omitted or disabled.

Continuing to the front end 142, the basic volume interface 236 provides an interface to the back end 144 for instances in which the front end 142 and back end 144 are run on different hardware. The basic volume interface 236 may also be disabled in the arrangement shown in FIG. 1.

The storage pool 232 organizes elements of the storage 180 in the form of slices. A "slice" is an increment of storage space, such as 256 MB or 1 GB in size, which is derived from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed by the RAID manager 252, dividing the RAID groups into FLUs (Flare LUNs), and further dividing the FLU's into slices.

The lower-deck file systems 230 are built upon slices managed by a storage pool 232 and represent both block-based objects and file-based objects internally in the form of files (e.g., container files). The data storage system 116 may host any number of lower-deck file systems 230, and each lower-deck file system may include any number of files. In a typical arrangement, a different lower-deck file system is provided for each data object to be stored. Each lower-deck file system includes one file that stores the data object itself (the primary object) and, in some instances, other files that store snaps of the file that stores the primary object. Some implementations may provide for storage of other files, such as auxiliary files, which support respective primary files. An example of an auxiliary file is a hybrid log, which stores pending metadata transactions directed to a primary object stored as a file in the same lower-deck file system. Each lower-deck file system 230 has an inode table. The inode table provides a different inode for each file stored in the respective lower-deck file system. The inode table may also store properties of the file(s), such as their ownership and block locations at which the file's/files' data are stored.

The volume-file mapping 228 maps each file representing a data object to a respective volume, which is accessible using block-based semantics. The volume-file mapping can be achieved in a variety of ways. According to one example, a file representing a data object is regarded as a range of blocks (e.g., 8K allocation units), and the range of blocks can be expressed as a corresponding range of offsets into the file. Because volumes are accessed based on starting locations (logical unit number) and offsets, the volume-file mapping 228 can establish a one-to-one correspondence between offsets into the file and offsets into the corresponding internal volume, thereby providing the requisite mapping needed to express the file in the form of a volume.

The replication splitter 226 sits above the volume-file mapping 228. The replication splitter 226 is configurable by the replication manager 162 on a per-data-object basis to intercept JO requests and to replicate (e.g., mirror) the data specified to be written in such requests according to data-object-specific settings. Depending on the data object to which the JO request is directed and the replication settings defined for that object, the replication splitter 226 may allow JO requests it receives to pass through to the volume-file mapping 228 unimpeded (e.g., if no replication is specified for that data object). Alternatively, the replication splitter 226 may intercept the IO request, forward the request to the replication appliance 160, and hold the request until the replication splitter 226 receives an acknowledgement back from the replication appliance 160. Once the acknowledgement is received, the replication splitter 226 may allow the IO request to continue propagating down the IO stack 140. It should be understood that the replication manager 162 can configure the replications splitter 226 in a variety of ways for responding to different types of IO requests 112. For example, replication manager 162 can configure the replication splitter 226 to operate in a pass-through mode for control IOs and for JO requests specifying data reads. In some situations, the replication manager 162 can configure the replication splitter 226 to intercept reads as well as writes. In any such situations, the replication manager 162 can configure the replication splitter 226 on a per-data-object basis.

The object-volume mapping layer 224 maps internal volumes to respective data objects, such as LUNs, host file systems, and vVOLs. Mapping underlying volumes to host-accessible LUNs may involve a remapping operation from a format compatible with the internal volume to a format compatible with the LUN. In some examples, no remapping is needed. Mapping internal volumes to host file systems, however, may be accomplished by leveraging from the fact that file systems are customarily built upon volumes, such that an underlying volume is part of the structure of a host file system. Host file systems, also called "upper-deck file systems," are thus built upon the internal volumes presented by the volume-file mapping 228 to provide hosts with access to files and directories. Mapping of vVOLs can be achieved in similar ways. For block-based vVOLs, the object-volume mapping layer 224 may perform mapping substantially as it does for LUNs. File-based vVOLs may be mapped, for example, by converting host-specified offsets into vVOL files to corresponding offsets into internal volumes.

The redirector 222 selectively redirects incoming JO requests 112 to another SP and/or to different data objects. In one example, the redirector 222 redirect JO requests 112 arriving at SP 120 to SP 120a for processing the JO requests on SP 120a. Such redirection may occur, for example, when an administrator has designated SP 120a as the "owner" of the data object to which the JO requests are directed. In another example, the redirector 222 redirects JO requests 112 to different data objects from those specified in the JO requests 112. For instance, and in accordance with particular improvements hereof, the redirector 222 may receive an JO request 112 directed to a file system replica (e.g., a target of replication operations). In such cases, the redirector 222 selectively redirects the JO request to a snap of the file system replica. For example, the redirector 222 replaces an FSID (file system identifier) specified in the JO request 112, which designates the file system replica, with an FSID of the snap. Lower levels of the JO stack 140 then perform read and/or write operations on the snap rather than on the replica.

The protocol end points 220 expose the underlying data objects to hosts in accordance with respective protocols for accessing the data objects. Thus, the protocol end points 220 may expose block-based objects (e.g., LUNs and block-based vVOLs) using Fiber Channel or iSCSI and may expose file-based objects (e.g., host file systems and file-based vVOLs) using NFS, CIFS, or SMB 3.0, for example.

In operation, the IO stack 140 receives an IO request 112 specifying data to be written to a particular data object. If the data object is owned by a different SP (e.g., SP 120a), the redirector 222 may redirect the IO request 112 to the owning SP. Processing of the IO request 112 then continues on the owning SP. If the data object is a replica, the redirector 222 may selectively modify the IO request 112 to replace the FSID of the replica with that of a snap of the replica.

As processing continues, the object-volume mapping 224 maps the IO request 112 to a block-based request 112a directed to an internal volume. The replication splitter 226 may intercept the block-based request 112a and send the block-based request 112a to the replication appliance 160 (or may pass through the IO request, depending on settings established by the replication manager 162 for the data object). Assuming the replication splitter 226 intercepts the block-based request 112a, the replication appliance 160 coordinates with other components to replicate the data specified in the block-based request 112a at a second site and provides the replication splitter 226 with an acknowledgement. When the replication splitter 226 receives the acknowledgement, the replication splitter 226 allows the block-based request 112*a* to continue propagating down the IO stack 140. The volume-file mapping 228 maps the block-based request 112*a* to one that is directed to a particular file of a lower-deck file system, and the back end 144 and storage 180 process the IO request by writing the specified data to actual media. In this manner, the IO stack 140 supports both local storage of the data specified in the IO request 112 and replication at a second site.

The replication splitter 226 may operate in both a source mode (described above) and in a destination mode. In destination mode, the replication splitter 226 receives mirrored IO requests arriving from another data storage system via the replication appliance 160. Lower levels of the IO stack 140 then process the mirrored IO requests to effect data writes to a local replica. It should be understood that IO requests arriving at the replication splitter 226 via the replication appliance 160 bypass the redirector 222, such that the redirector 222 does not redirect mirrored writes.

Figure 3:
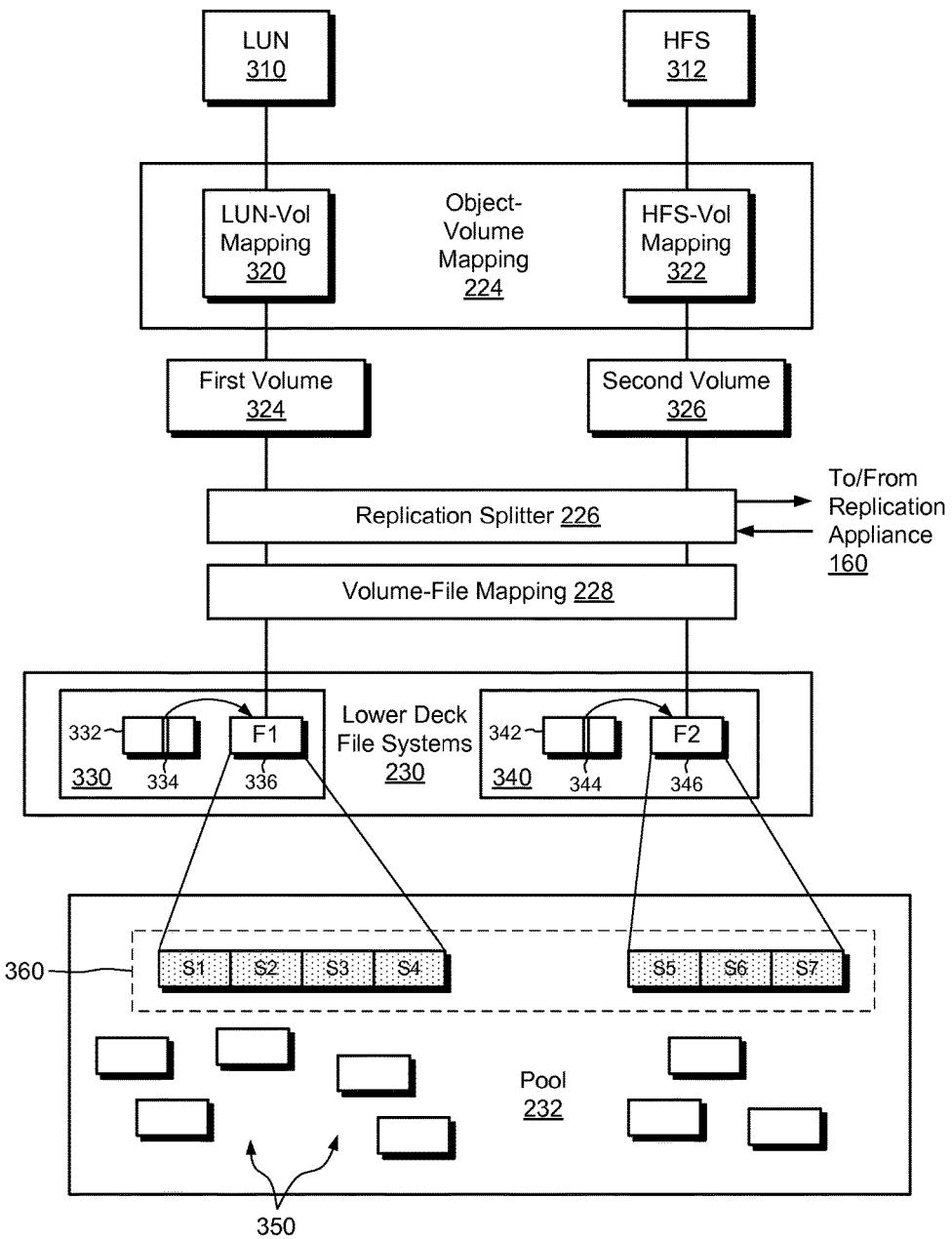
FIG. 3 is a block diagram showing example features of the IO stack of FIG. 2 in additional detail.

FIG. 3 shows portions of the front end 142 in additional detail. Here, data objects include a LUN 310 and an HFS (host file system) 312. The object-volume mapping 224 includes a LUN-to-Volume mapping 320 and an HFS-to-Volume mapping 322. Using the approach described above, the LUN-to-Volume mapping 320 maps the LUN 310 to a first volume 324, and the HFS-to-Volume mapping 322 maps the HFS 312 to a second volume 326. The replication splitter 226 may intercept IOs in accordance with settings established by the replication manager 262 (as described above). The Volume-to-File mapping 228 maps the first and second internal volumes 324 and 328 to respective files 336 (F1) and 346 (F2) in respective lower-deck files systems 330 and 340. Through the various mappings, any set of blocks of the LUN 310 specified in an JO request 112 is mapped to a corresponding set of blocks within the first file 336. Similarly, any file or directory of the HFS 312 specified in an JO request 112 is mapped to a corresponding set of blocks within the second file 346.

The lower-deck file system 330 includes an inode table 332, and the lower-deck file system 340 includes an inode table 342. An inode 334 provides file-specific information about the first file 336, and an inode 344 provides file-specific information about the second file 346. The information stored in each inode includes location information (e.g., block locations) where data of the respective file are stored.

Although a single file is shown for each of the lower-deck file systems 330 and 340, it is understood that each of the lower-deck file systems 330 and 340 may include any number of files, with each having its own entry in the respective inode table. In one example, each lower-deck file system stores not only the file F1 or F2, but also one or more snaps of those files, and therefore snaps of the data objects the files store. For example, the first lower-deck file system 330 stores the first file 336 representing the LUN 310 along with a different file for each snap of the LUN 310. Similarly, the second lower-deck file system 340 stores the second file 346 representing the HFS 312 along with a different file for every snap of the HFS 312. In addition, any of the lower-deck file systems 230 may also include one or more auxiliary files for supporting the primary object stored in therein.

As shown, the storage pool 232 allocates slices 360 for providing storage for the first file 336 and the second file 346. In the example shown, slices S1 through S4 store the data of the first file 336, and slices S5 through S7 store the data of the second file 346. The data that make up the LUN 310 are thus stored in the slices S1 through S4, whereas the data that make up the HFS 312 are stored in the slices S5 through S7.

It should be understood that the IO stack 140 may represent vVols and other objects in a manner similar to LUNs and file systems, i.e., as container files in one or more lower-deck file systems 230, with the container files expressed as volumes. Such volumes for vVols and other objects are amenable to replication in the same manner as are LUNs and file systems.

II) Continuous Synchronous and Asynchronous Replication:

Various arrangements for performing synchronous and asynchronous continuous replication will now be described in connection with FIGS. 4 and 5. As is known, "synchronous" replication refers to replication performed in band with IO requests 112 as the IO requests are processed. In contrast, "asynchronous" replication is performed out of band with individual IO requests, with replicas generated, for example, on demand, at regular intervals, and/or in response to particular events. "Continuous" replication provides any-point-in-time recovery and may be performed using synchronous or asynchronous replication technologies.

Figure 4:
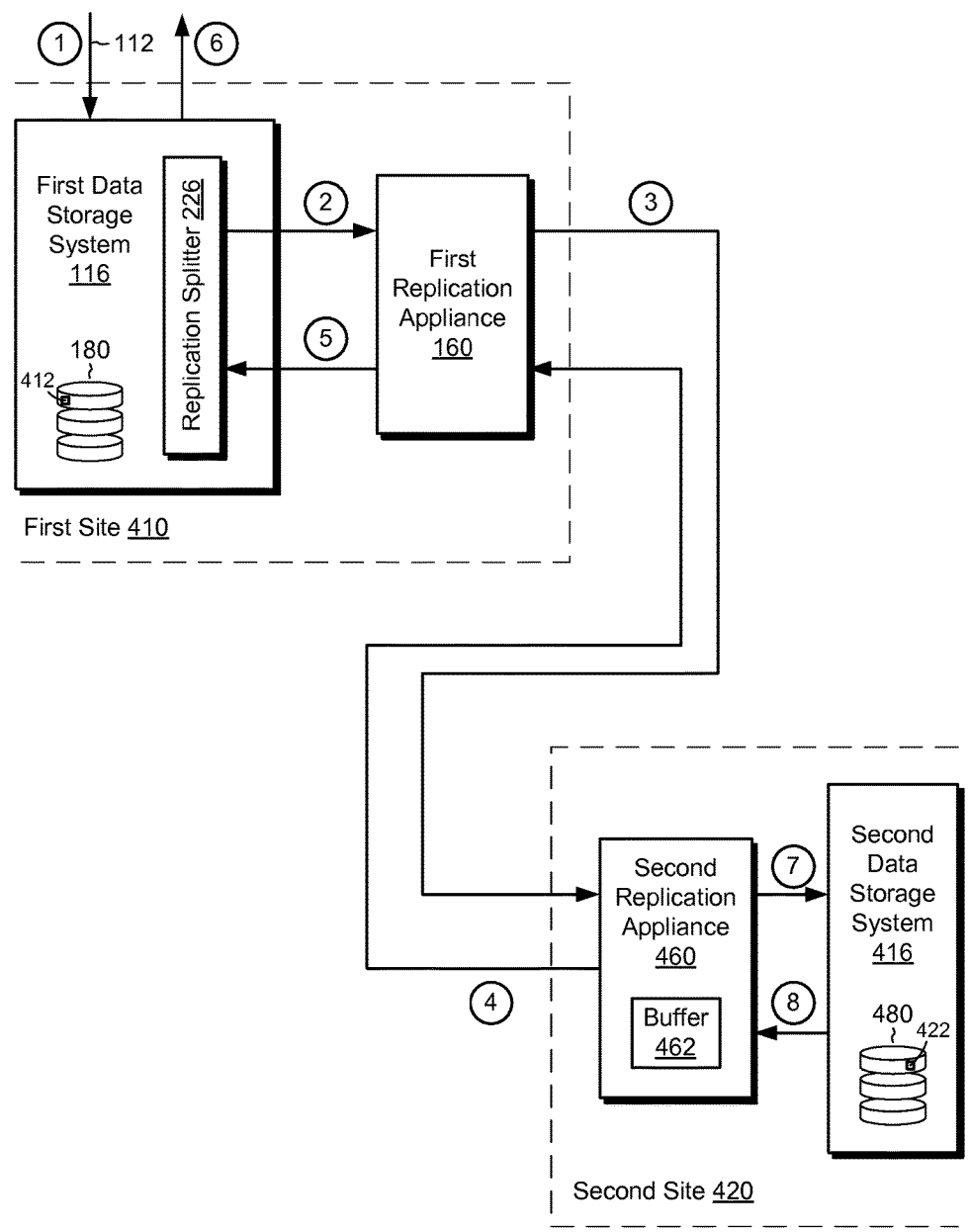
FIG. 4 is a block diagram showing an example arrangement for synchronously replicating a data object between a first data storage system at a first site and a second data storage system at a second site.

FIG. 4 shows an example arrangement for performing synchronous replication of a data object 412 stored on a first data storage system 116 (FIG. 1) to a second data storage system 416. Here, the first data storage system 116 is located at a first site 410 (i.e., at a "source") and the second data storage system 416 is located at a second site 420 (i.e., at a "destination"). In an example, the first site 410 and the second site 420 are located at different geographical locations, such as in different rooms or in different buildings of a city or campus. The second data storage system 416 includes persistent storage 480 (e.g., disk drives, flash drives, and the like) and is operatively connected to a second replication appliance 460. The second replication appliance 460 includes a buffer 462, which may be implemented in non-volatile memory (e.g., on disk or flash). In some examples, the buffer 462 is implemented with high-speed, non-volatile memory within the storage 480, but separate and apart from any replica storage. Further, the second replication appliance 460 may be included entirely within the second data storage 416. Although the components at the first site 410 and the second site 420 are shown to be different, they may alternatively be the same, so as to provide symmetrical behavior, with each site acting as a replica site for data objects stored on the other. As shown in this example, however, the first site 410 acts to receive and process IO requests 112 from hosts for accessing the data object 412, whereas the second site 420 acts to maintain a replica 422 of the data object 412.

The encircled numbers in FIG. 4 identify an example sequence of events. At (1), the first data storage system 116 receives an IO request 112 specifying data to be written in the storage 180 for a particular data object 412 (e.g., a LUN, a host file system, a vVOL, etc.). The IO request 112 propagates down the IO stack 140 (FIG. 2) and encounters the replication splitter 226. The replication splitter 226 intercepts the 10 request and temporarily prevents the IO request from propagating further down the IO stack 140 (FIG. 2). At (2), the replication splitter 226 sends the IO request (e.g., a version thereof) to the first replication appliance 160. At (3), the first replication appliance 160 forwards the IO request to the second replication appliance 460, which stores the data specified in the IO request in the buffer 462. At (4), the second replication appliance 460 acknowledges safe storage of the data specified in the IO request to the first replication appliance 160 (e.g., that the data specified in the IO request are persisted in the buffer 462). At (5), the first replication appliance 160 in turn acknowledges receipt to the replication splitter 226. Only when the replication splitter 226 receives the acknowledgement does the replication splitter 226 allow the IO request to continue propagating down the IO stack 140 (FIG. 2) to complete the write operation to the storage 180. At (6), the first data storage system 116 acknowledges completion of the IO request 112 back to the originating host. Asynchronously with the IO request, the second replication appliance 460 may de-stage the buffer 462 to the replica 422 of the data object maintained in the storage 480. For example, at (7), the data specified in the IO request are transferred from the buffer 462 to the storage 480, and at (8), the second data storage system 416 acknowledges completion.

Many variants of the above-described arrangement are contemplated. For example, the buffer 462 may be realized using volatile memory (e.g., RAM). In such cases, the second replication appliance 460 may wait to acknowledge a write to the first replication appliance 160 until it receives confirmation that the data specified in the IO request has been persisted in the replica 422 for the data object 412 in the storage 480.

As described, the first data storage system 116 conducts synchronous replication with the second data storage system 416 on a per-data-object basis and in accordance with object-specific settings. The replication manager 162 establishes these settings and orchestrates replication activities, recovery activities, and failover activities. In some implementations, the GUI application 164 is a modified form of the Unisphere integrated management tool, available from EMC Corporation of Hopkinton, Mass.

Figure 5:
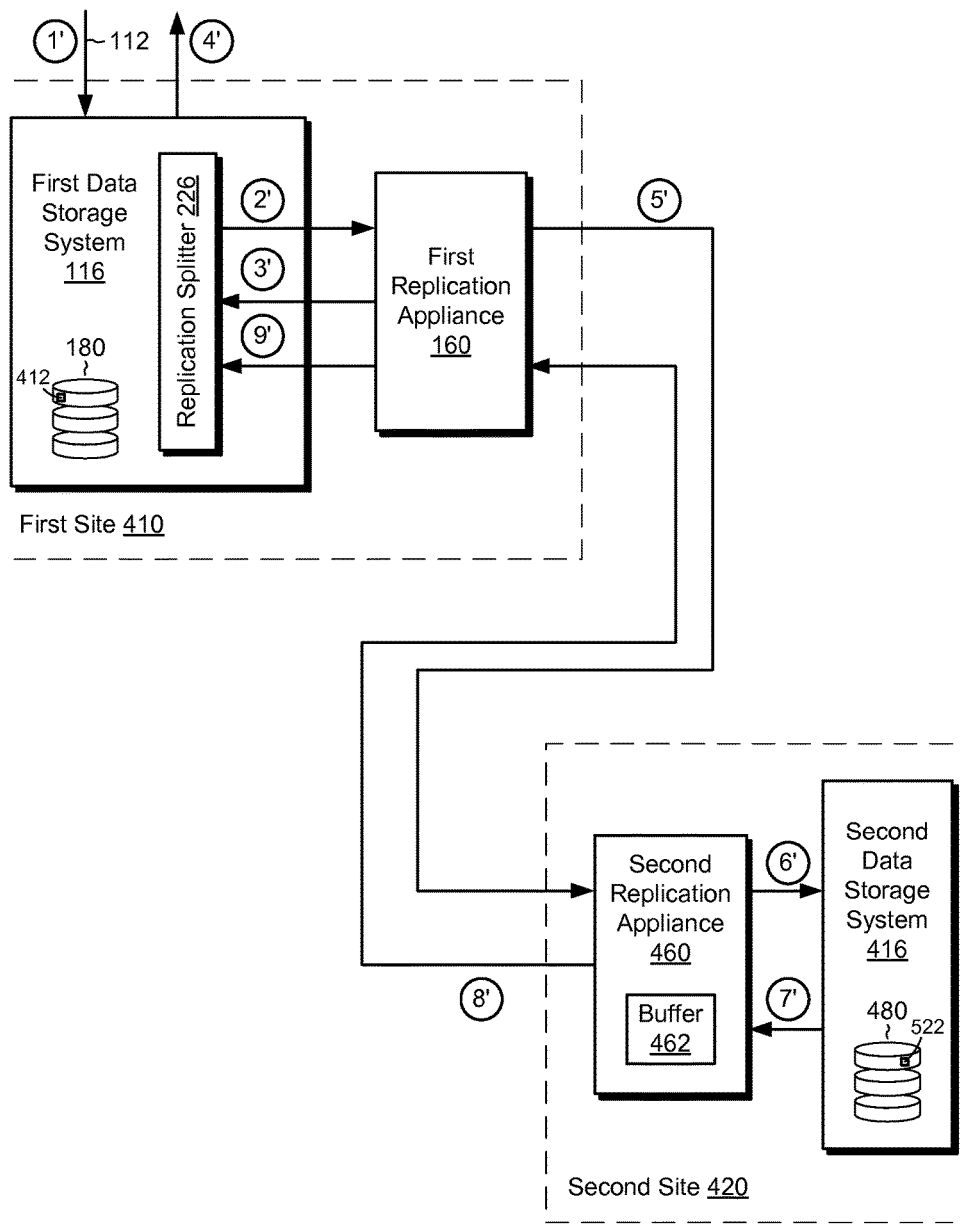
FIG. 5 is a block diagram showing an example arrangement for asynchronously replicating the data object using replication splitters and replication appliances.

FIG. 5 shows an example technique for effecting asynchronous replication of data object 412. Here, on the first data storage system 116, the replication manager 162 configures the replication splitter 226 (FIGS. 2-4) to operate in accordance with the data-object-specific settings for performing asynchronous replication on the data object 412. In an example, the replication manager 162 identifies the internal volume (FIGS. 2 and 3) corresponding to the data object 412 in the IO stack 140 and activates the replication splitter 226 on the identified volume. Then, whenever the replication splitter 226 receives an IO request specifying data to be written to the internal volume, the replication splitter 226 performs actions in accordance with the object-specific asynchronous settings for the data object 412. These settings may differ from those specified for synchronous replication, or in some circumstances may be the same.

In an example, the replication manager 162 directs the replication splitter 226, in accordance with the object-specific settings, to intercept IO requests 112 specifying writes to the data object 412 and temporarily to prevent them from propagating further down the IO stack 140 (FIG. 2) until the replication splitter 226 has received acknowledgements from the first replication appliance 160 (i.e., in a manner similar to actions performed for synchronous replication). In this case, however, the first replication appliance 160 has been configured to provide acknowledgements as soon as it persists the specified data locally, e.g., in the appliance 160 itself, rather than to wait for acknowledgements from the second replication appliance 460. The first replication appliance 160 accumulates data from the replication splitter 226 and sends the data to the second site 420 on a regular basis and/or upon the occurrence of specified events, i.e., in accordance with the data-object-specific settings for the object 412.

The encircled numbers in FIG. 5 show an example sequence for performing asynchronous replication. At (1'), the first data storage system 116 receives an IO request 112 from a host (e.g., one of 110(1-N)). The IO request 112 specifies data to be written to the data object 412 in the storage 180. The IO request 112 propagates down the IO stack 140 (FIG. 2) and reaches the replication splitter 226.

At (2'), the replication splitter 226, acting in accordance with the object-specific asynchronous replication settings for the object 412, mirrors the IO request 112 (i.e., a block-based form thereof) to the first replication appliance 160. The replication splitter 226 also temporarily prevents the IO request 112 from propagating further down the IO stack 140.

At (3'), the first replication appliance 160 sends an acknowledgement back to the replication splitter 226, confirming that it has received and persisted the data specified in the IO request 112. In response to receiving the acknowledgement, the replication splitter 226 allows the IO request 112 to continue propagating down the IO stack 140 to effect writing of the data specified in the IO request 112 to the storage 180.

At (4'), the first data storage system 116 sends an acknowledgement back to the host that originated the IO request 112, confirming that the IO request 112 has been processed.

At (5'), which may occur at some later time after the first replication appliance 160 has accumulated data from multiple IO requests, the first replication appliance 160 sends the accumulated data to the second replication appliance 460 at the second site 420. the second replication appliance 460 stores the data in the buffer 462.

At (6'), the second replication appliance 160 sends the data to the second data storage system 416, which writes the data to a replica 522. The replica 522 is a replica of the object 412 generated via asynchronous replication and thus may differ from the replica 422 (FIG. 4) generated by synchronous replication.

At (7'), the data storage system 416 acknowledges to the second replication appliance 460 that the replica 522 has been written, and at (8'), the second replication appliance 460 sends an acknowledgement back to the first replication appliance 160.

The above sequence can be repeated on a regular basis and/or in response to particular events, as specified in the data-object-specific settings, to ensure that the state of the replica 522 does not fall far behind that of the object 412. Of course, the above sequence may also be used for asynchronously replicating other data objects.

Many variants of this asynchronous replication sequence are contemplated. According to one variant, the replication manager 162 directs the replication splitter 226 in accordance with data-object-specific settings to mirror JO requests specifying writes to the first replication appliance 160 (or to some other appliance) without holding back the IO requests until acknowledgements are received. Thus, the first data storage system 116 may process IO requests in the usual way, with the replication splitter 226 operating to mirror IO requests but not to intercept them.

The above-described technique manages continuous synchronous and asynchronous replication of block-based objects and/or file-based objects via a common replication manager 162 configured from a common GUI application 164. The replication manager 162 can access different settings for different data objects (e.g., LUNs, file systems, block-based vVOLs (virtual volumes), file-based vVOLs, etc.), with replication settings maintained on a per-dataobject basis. The replication manager 162 can also orchestrate synchronous and/or asynchronous replication sessions, failover, and/or recovery, for any given data object in accordance with the particular settings established for that data object.

III) Accessing File System Replica During Ongoing Replication Operations:

Example techniques for accessing file system replicas during ongoing replication operations will now be described in connection with FIGS. 6-12. The techniques presented in this section are consistent with those described in the sections above and may be performed in the same or a similar environment as those described above using the same or similar data storage systems, storage processors, and replication technologies.

Figure 6:
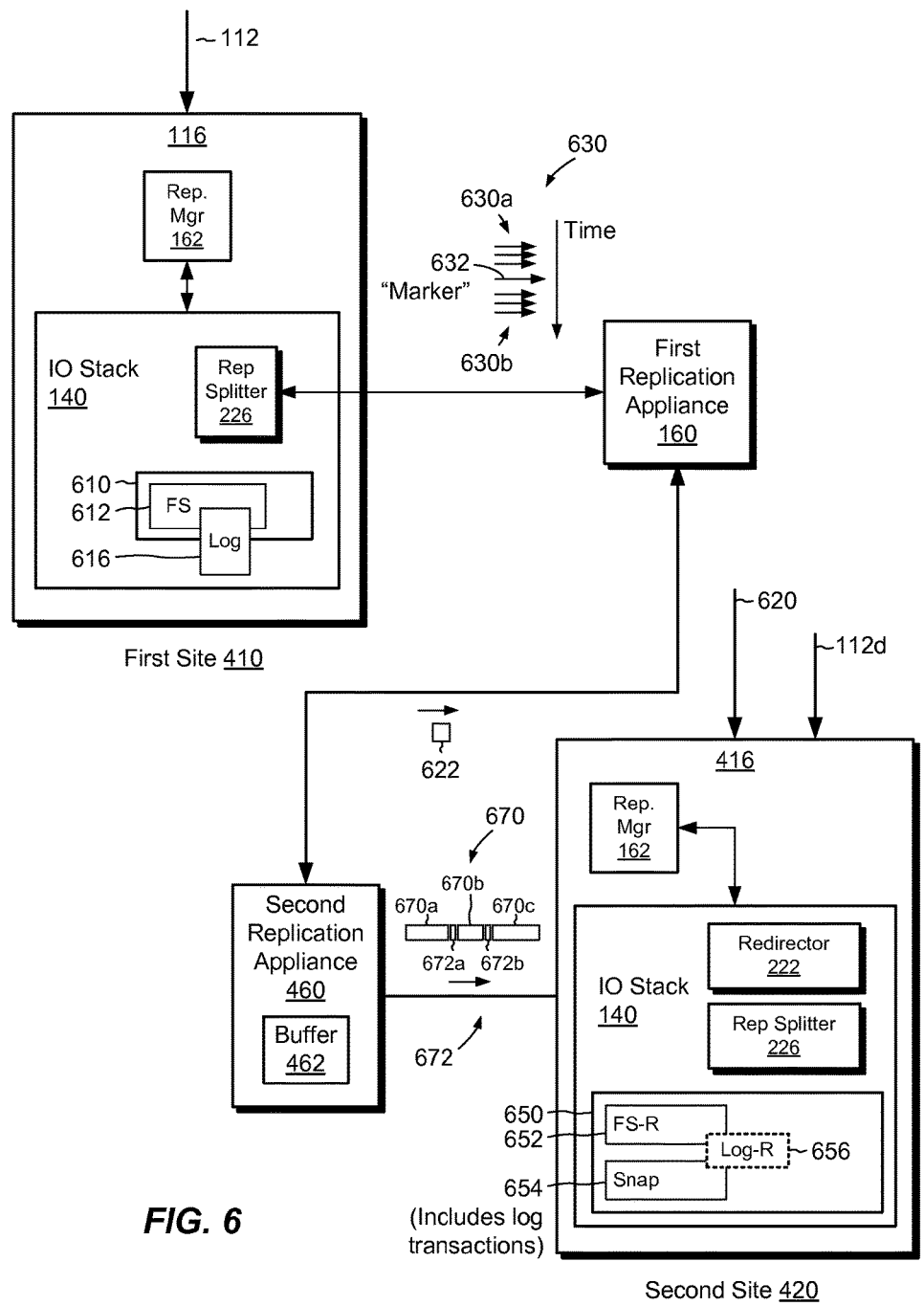
FIG. 6 is a block diagram showing an example technique for replicating a file system on a first data storage system to a replica on a second data storage system and for providing access to a snap of the replica on the second data storage system for reading and/or writing the snap.

FIG. 6 shows an example arrangement for providing access to a replica 652 of a file system 612, where the file system 612 is actively being replicated from the first data storage system 116 at the first site 410 to the second data storage system 416 at the second site 420. In the example shown, the first and second data storage systems 116 and 416 and their constituents are the same as, or similar to, those described above in connection with FIGS. 1-5. Replication may proceed using any of the technologies described above, such as continuous synchronous replication and continuous asynchronous replication, as well as other replication technologies.

Here, the first data storage system 116 stores file system 612 ("FS") in the form of a container file within a lower-deck file system 610, i.e., in an internal file system of the kind described in connection with FIGS. 2 and 3. The first data storage system 116 is coupled to the second data storage system 416, e.g., over the network 114 (FIG. 1). The second data storage system 416 maintains a replica 652 ("FS-R") of the file system 612. The second data storage system 416 stores the replica 652 in the form of a container file within a lower-deck file system 650.

In example operation, the replication managers 162 on the data storage systems 116 and 416 coordinate to effect replication of the file system 612 on the first data storage system 116 to the replica 652 on the second data storage system 416. For example, the first data storage system 116 receives IO requests 112, e.g., from hosts 110(1) to 110(N) (FIG. 1). The IO requests 112 specify data to be written to the file system 612. The replication splitter 226 in the first data storage system 116 intercepts the IO requests 112 and mirrors data 630 specified in the IO requests 112 to the second data storage system 416 via the replication appliances 160 and 460. Upon receiving the data 630, the second data storage system 416 updates the replica 652 to keep the replica 652 approximately current with the file system 612 to within specified replication settings. Typically, the data 630 specified in the IO requests 112 include data sent over the course of multiple replication operations. For example, a different replication operation may be performed for each IO request 112, such that the data 630 includes the aggregation of data sent over all such IO requests.

In the course of conducting the above-described replication operations, the second data storage system 416 may encounter an instruction 620, e.g., from one of the hosts 110(1) to 110(N) or from an administrator, to perform a snap-while-replicating operation. In response to the instruction 620, the second data storage system 416 takes a snap 654 (point-in-time version) of the replica 652. The second data storage system 416 then makes the snap 654 available to hosts 110(1) to 110(N) and/or to administrators. In some examples, the redirector 222 may redirect IOs requests 112d arriving at the second data storage system 416 and directed to the replica 652 to the snap 654 instead. For example, the replica 652 and the snap 654 each have a unique FSID on the second data storage system 416. In a manner similar to that described in connection with FIG. 2, the redirector 222 modifies IO requests 112d to replace any FSID specifying the replica 652 with the FSID of the snap 654. IO requests 112d directed to the replica 652 on the second data storage system 416 are thus redirected to the snap 654, to effect reading and/or writing operations on the snap 654, rather than on the replica 652 itself. The replica 652 remains undisturbed, but hosts and administrators may still access its data via the snap 654, for performing backup, for testing disaster recovery, and/or for performing other activities.

In some examples, the second data storage system 416 takes snaps of the replica 652 at regular intervals, so as to ensure that there is generally a snap on hand that reflects an approximately current state of the replica 652. In some examples, the second data storage system 416 has a snap retention policy and keeps snaps of the replica 652 for some designated period of time. In other examples, each snap of the replica 652 is deleted as soon as a new snap is created, thereby limiting the number of snaps of the replica 652 to a single snap.

In some examples, no explicit instruction 620 to perform the snap-while-replicating operation is required. For instance, an administrator may configure the replication manager 162 via the GUI application 164 (FIG. 1) to create the snap 654 of the replica 652 automatically, i.e., by specifying a replication setting for the file system 612. An administrator may also use the GUI application 164 to configure a refresh rate for the snap 654, as well as a snap retention policy, if desired. In some examples, the administrator may configure replication on the file system 612 such that the snap 654 is created only as needed, in response to IO requests 112d arriving at the second data storage system 416 and attempting to access the replica 652. Thus, the second data storage system 416 may create the snap 654 on a just-in-time basis.

It should be understood that the redirector 222 is not strictly required. For example, users wishing to access the replica 652 may typically be administrators or other sophisticated users. Such users are able to obtain the FSID of the snap 654 by querying the second data storage system 416 and may thus address IO requests 112d to the snap 654 rather than to the replica 652, with no need for redirection by the redirector 222.

The snap 654 is a point-in-time version of the replica 652. As indicated in connection with FIGS. 2 and 3, the IO stack 140 represents file systems as container files in internal, lower-deck file systems 230. Taking the snap 654 of the replica 652 thus amounts to taking a snap of the container file that realizes the replica 652. The snap 654 is thus a file in the lower-deck file system 650 that has an inode similar to the inode of the replica 652 (although inode number and other details may differ). In an example, the IO stack 140 takes the snap 654 without copying any blocks of file data; rather, taking the snap 654 is a metadata operation and can be performed without disturbing the replica 652 or even having to mount the replica 652. As data 630 continues to update the replica 652, write splits may allocate new blocks to store newly arriving data, but new blocks become part of the replica 652 and not part of the snap 654.

In some examples, hosts 110(1) to 110(N) and/or administrators may mount the snap 654 read-only, e.g., for performing backups. In other examples, hosts or administrators may mount the snap 654 read/write. For instance, an administrator may need to write to the snap 654 as well as to read from the snap 654 to confirm that the replica 652 can effectively take over for the file system 612 in the event of failover to the second data storage system 416.

In some examples, it may be necessary to synchronize generating the snap 654 at the second data storage system 416 with arriving data 630. Referring further to FIG. 6, it is seen that the second replication appliance 460 destages data from the buffer 462 to the replica 652 in discrete bunches 670. Each bunch (e.g., 670a, 670b, 670c, etc.) includes data from multiple consecutive IO requests 112, but the data within each bunch 670 are not necessarily in order. To promote write-order fidelity, the second replication appliance 460 provides bunch terminators 672 to mark boundaries between consecutive bunches 670. When the second data storage system 416 receives a bunch terminator (e.g., any of 672a, 672b, etc.), it can proceed with the assurance that data specified for consecutive IO requests 112 in the preceding bunch have all been received. When generating the snap 654, the replication manager 162 and replication splitter 226 in the second data storage system 416 coordinate with the second replication appliance 460 to take the snap 654 only after applying all data received in one bunch 670 to the replica 652 but before applying any data from a next bunch. In this manner, write-order fidelity is maintained in the replica 652, and thus also in the snap 654, even though data transferred within any bunch 670 may be out of order.

In some examples, the file system 612 on the first data storage system 116 may operate in connection with a transaction log 616. The transaction log 616 stores pending metadata changes directed to the file system 612, which transactions have not yet been applied to metadata structures within the file system 612 itself. The transaction log 616 may take various forms. In one example, the transaction log 616 is embedded within the file system 612 itself, in a so-called "split log" arrangement. In another example, the transaction log 616 is provided in an auxiliary file located in the same lower-deck file system 610 that stores the file system 612, in a so-called "hybrid log" arrangement. In yet another example, the transaction log 616 is provided as a common log. Unlike the split log and hybrid log, which are specific to a single file system (here the file system 612), the common log may be common to multiple file systems. In some examples, the second data storage system 416 stores a replica 656 of the transaction log 616 and can apply pending metadata transactions from the log replica 656 to the snap 654 directly, such that a file system image in the snap 654 is made to assume a consistent state. In other examples, no log replica 656 is used, and the first data storage system 116 applies pending metadata changes to the file system 612 as replication ensues, with replication operations effectively applying the same log transactions to the replica 652 as are applied to the file system 612. In either case, the file system image in the snap 654 is preferably made to assume a consistent state prior to being exposed to hosts or administrators.

In cases where no log replica 656 is used, the first data storage system 116 may send a marker 632 among the data 630 to mark a location relative to the replicating data 630 at which all transactions in the log 616 for the file system 612 have been applied. The marker 632 thus delineates data 630a from data 630b, where data 630a are associated with replication operations prior to applying all pending metadata transactions from the log 616 to the file system 612, and where data 630b are associated with replication operations after applying all pending metadata transactions to the file system 612. The replication splitter 226 in the first data storage system 116 may generate the marker 632 in the form of a metadata IO, i.e., as a message sent in the stream of replicating data 630 with no associated data payload. At the second data storage system 416, the replication manager 162 coordinates with the replication splitter 226, which waits to receive the marker 632. Upon receiving the marker 632, and preferably before processing any data 630b, the splitter 226 alerts the replication manager 162, which in turn directs the IO stack 140 to take the snap 654. Thus, the second data storage system 416 takes the snap 654 only after all pending metadata transactions for the file system 612 have also been applied to the replica 652.

Figure 7:
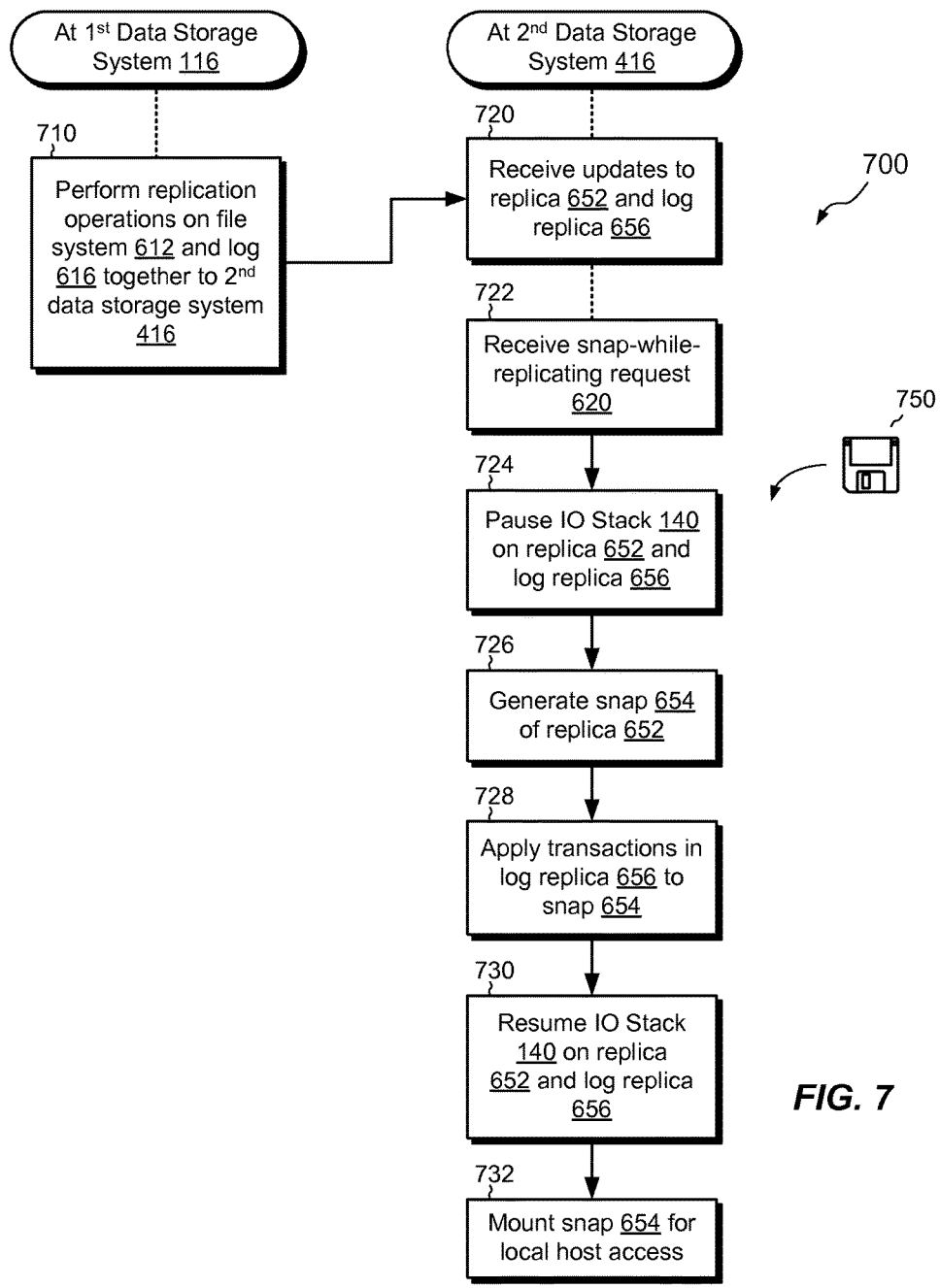
FIG. 7 is a flowchart showing an example process for applying pending log transactions to the snap on the second data storage system to bring the snap to a consistent state.
Figure 8:
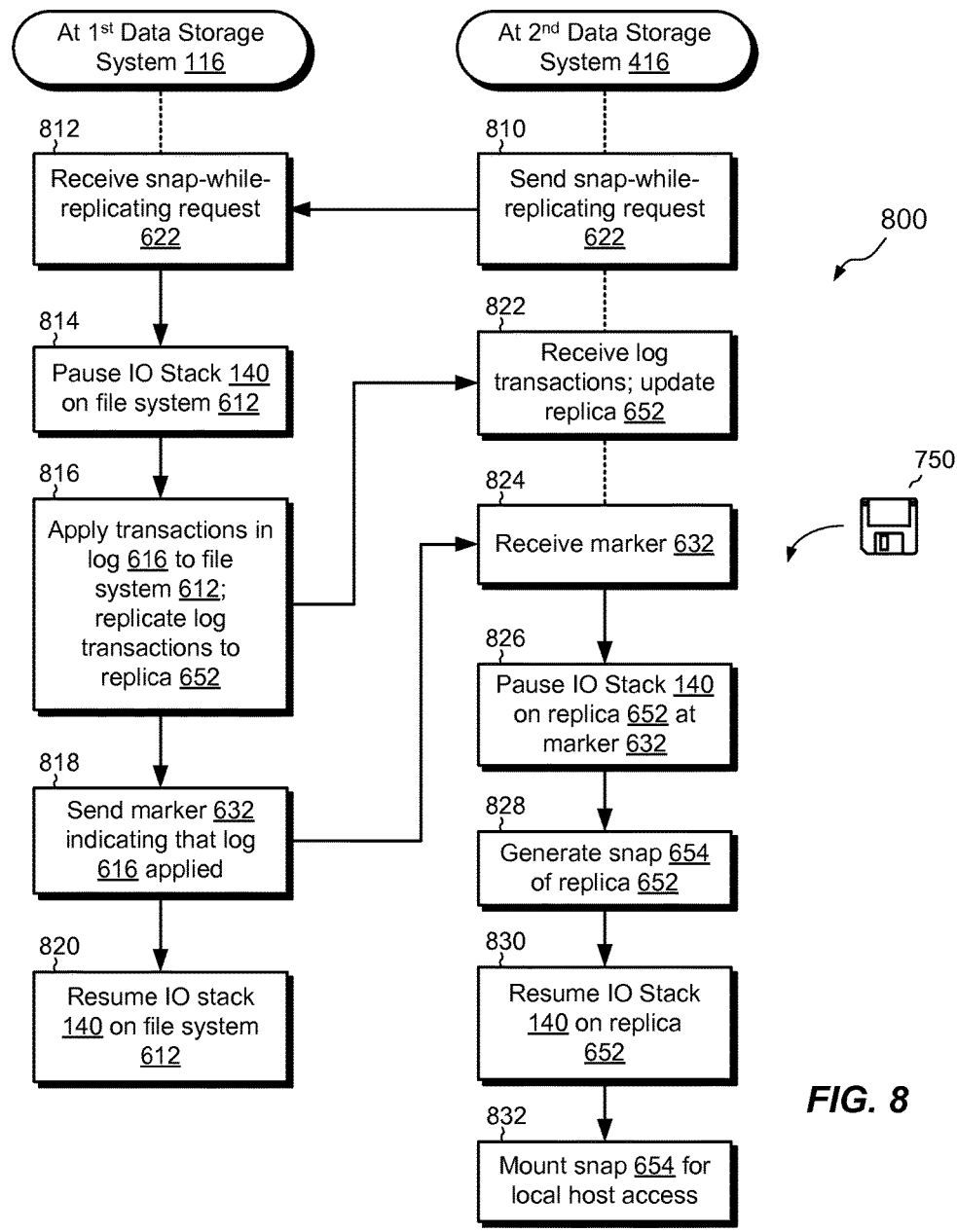
FIG. 8 is a flowchart showing an example process for applying pending log transactions to the file system on the first data storage system and replicating the pending log transactions to the replica to bring the replica to a consistent state prior to taking the snap.

FIGS. 7 and 8 show processes 700 and 800 for ensuring that the file system image within the snap 654 reflects pending metadata transactions prior to giving users access to the snap 654. The process 700 covers the case where the second data storage system 416 includes a log replica 656, whereas the process 800 covers the case where no log replica 656 is required. The processes 700 and 800 may be carried out, for example, in connection with the data storage systems 116 and 416, such as by the software constructs described in connection with FIGS. 1-3, which reside in the memories 130 of the respective storage processors 120 and are run by the respective sets of processing units 124.

Turning first to FIG. 7, it is seen that the process 700 is separated into left and right portions, which respectively show activities that take place at the first data storage system 116 and at the second data storage system 416.

Figure 9A:
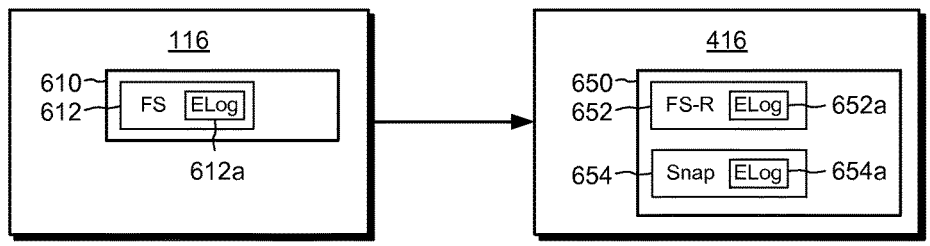
FIGS. 9a-9c are block diagrams showing example transaction log configurations.
Figure 9B:
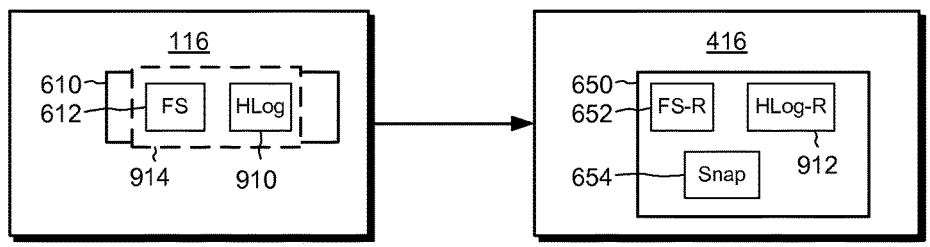
Figure 9C:
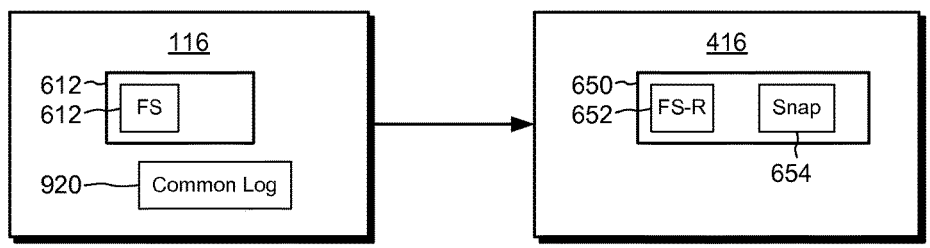

At the first data storage system 116, and as shown at 710, replication operations are performed on the file system 612 and on the transaction log 616 together, to replicate both the file system 612 and the transaction log 616 to the second data storage system 416. In one example, the transaction log 616 is implemented as a split log embedded within the file system 612. Turning briefly to FIG. 9a, an example split log is shown, where the transaction log 616 is embedded within the file system 612 in the form of as embedded log ("ELog") 612a. Performing replication operations on the volume-file representing the file system 612 inherently also performs replication operations on the embedded log 612a, as the embedded log 612a is part of the file system 612. In another example, the transaction log 616 is implemented as a hybrid log. Turning briefly to FIG. 9b, a hybrid log ("HLog") 910 is realized as an auxiliary file within the same lower-deck file system 610 that stores, in the form of a container file, the file system 612. The file system 612 and the hybrid log 910 each have a volume realization with the IO stack 140 (FIGS. 2 and 3) in the first data storage system 116. The replication manager 162 groups the volume realizations for the file system 612 and the hybrid log 910 together into a consistency group 914. When replicating members of a consistency group, replication operations treat all members as a single object. Thus for example, the replication manager 162 directs the replication splitter 226 in the first data storage system 116 to replicate IO requests directed to both the file system 612 and the hybrid log 910 in the same way and according to the same settings. As replication operations proceed at the first data storage system 116, e.g., either synchronously or asynchronously, the second data storage system 416 performs the following acts.

At 720, the second data storage system 416 receives updates to the replica 652 and to the log replica 656 in response to the replication operations performed at the act 710. If the first data storage system 116 implements the transaction log 616 as a split log (FIG. 9a), then the second data storage system 416 applies the updates to the log replica 656 by updating the embedded log 652a as an inherent part of updating the replica 652. However, if the first data storage system 116 implements the transaction log 616 as a hybrid log (FIG. 9b), then the second data storage system 416 applies the updates to the log replica 656 by updating a log replica ("HLog-R") 912, which is a replica of the hybrid log 910.

At 722, the second data storage system 416 receives a snap-while-replicating request 620. For example, an administrator or other user of the second data storage system 416 may send the request 620 to direct the second data storage system 416 to generate the snap 654. Alternatively, the replication manager 162 may internally issue the instruction 620 to generate the snap 654. Such internal instruction may be based, for example, on a desired snap refresh rate specified in replication settings or based upon the second data storage system 416 receiving an IO request 112d directed to the replica 652, for example.

At 724, the second data storage system 416 may pause its IO stack 140 with regard to processing on the replica 652 and on the log replica 656. For example, the replication manager 162 directs the replication appliance 460 momentarily to stop its destaging of data 630 from the buffer 462. The replication manager 162 also directs the replication splitter 226 momentarily to stop applying replicated data to the replica 652 and, if separate, to the log replica 656. If synchronization is needed to ensure write-order fidelity (as described in connection with bunches 670 in FIG. 6), then the IO stack 140 may wait to pause until it has reached the next bunch terminator 672.

At 726, once the IO stack 140 has been paused, the second data storage system 416 generates the snap 654 of the replica 652. If the first data storage system 116 uses a split log, then the snap 654 of the replica 652 includes both a file system image and an image 654a of the embedded log (FIG. 9a). If the first data storage system 116 uses a hybrid log, then the snap 654 contains no image of the hybrid log, although the replica 912 of the hybrid log is still present as a separate object (FIG. 9b). In some situations, it may be desirable to take a snap of the hybrid log replica 912 at the same time the snap 654 is taken of the replica 652. This is not required, however.

At 728, while the IO stack 140 is still paused, the second data storage system 416 applies pending metadata transactions from the log replica 656 to the snap 654. For the split log arrangement, this act involves syncing the metadata transactions in the embedded log 654a in place within the snap 654. For the hybrid log arrangement, this act involves applying metadata transactions from the hybrid log replica 912 to the snap 654. Applying log transactions updates the file system image within the snap 654 with pending metadata changes to place the file system image in the snap 654 in a consistent state. The file system image in the snap 654 is thus made to differ somewhat from the file system image in the replica 652, as the file system image in the replica 652 is not required to be consistent at this time.

At 730, the second data storage system 416 resumes (unpauses) the IO stack 140 on the replica 652 and on the log replica 656 to allow replication operations to proceed.

At 732, with the file system image in the snap 654 in a consistent state, the second data storage system 416 can mount the snap 654 for local access. IO requests 112d (FIG. 6) can then be received and processed to effect read and/or write operations on the snap 654.

It is not necessary always to wait to unpause the IO stack 140 until after applying all log transactions to the snap 654. For example, if a snap of the log replica 656 is available, as is inherently the case for the split log and can easily be accommodated for the hybrid log, then the IO stack 140 can be unpaused as soon as the snapping is complete, as applying log transactions to the snap 654 can be accomplished with access to the snap of the log replica 656 rather than to the log replica 656 itself. Also, some data storage systems may allow snaps to be taken without pausing the IO stack 140 at all. In such systems, pausing the IO stack 140 may be avoided altogether.

Turning now to FIG. 8, the process 800 is also separated into left and right portions, which respectively show activities that take place at the first data storage system 116 and at the second data storage system 416. The process 800 covers situations in which no log replica 656 is provided (or none is used), such that the first data storage system 116 performs the role itself of applying pending metadata transactions to the file system 612. In an example, the process 800 is performed when the first data storage system 116 uses a common log 920 (FIG. 9c); however, the process 800 can be used with any log arrangement. At the start of the process 800, it is assumed that replication of the file system 612 (FIG. 6) is ongoing, with data 630 being transferred in replication operations from the first data storage system 116 to the second data storage system 416.

At 810, the second data storage system 416 sends a snap-while-replicating request 622 to the first data storage system 116. The second data storage system 416 may send the request 622 after it receives the request 620 from an administrator or other user, i.e., to coordinate snap-while-replicating activities. Alternatively, the second data storage system 416 may send the request 622 automatically, such as based on a schedule for snapping as defined in replication settings for the file system 612, or in response to the second data storage system 416 receiving IO requests 112d (FIG. 6) specifying reads or writes to the replica 652.

At 812, the first data storage system 116 receives the snap-while-replicating request 622. Alternatively, the first data storage system 116 may initiate the snap-while-replicating activity itself, so that no request 622 need be received. Although some coordination preferably takes place between the first and second data storage systems 116 and 416, it should be understood that the exact means of communication may be varied and the example shown is merely illustrative.

At 814 and in response to the request 622, the first data storage system 116 pauses its IO stack 140 with regard to the file system 612. For example, the replication manager 162 in the first data storage system 116 directs the IO stack 140 temporarily to stop processing IO requests 112 directed to the file system 612.

At 816, the first data storage system 116 applies pending metadata transactions stored in the transaction log 616 to the file system 612. For example, the first data storage system 116 reads transactions from the transaction log 616 and sends them as internal IO requests to the replication splitter 226, which mirrors the internal IO requests to the replica 652 and sends them to the original file system 612. In particular, the splitter 226 mirrors the internal IO requests to the second data storage system 416 for writing the pending transactions to the replica 652 and passes the internal IO requests further down the IO stack 140 to effect writing to the local file system 612. Thus, the first data storage system 116 applies the metadata transactions from the log 616 to the local file system 612 and replicates the transactions to the replica 652 on the second data storage system 416.

At 818, the first data storage system 116 sends the marker 632 in line with the replicating data 630 to indicate that the pending metadata transactions in the log 616 have been applied. For example, after processing the last pending metadata transaction for the file system 612 from the log 616, the replication splitter 226 sends the marker 632 as a metadata IO to the first replication appliance 160 (FIG. 6), which in turn forwards the IO to the second replication appliance 460 and eventually to the second data storage system 416. The marker 632 delineates data 630a, for replication operations that include log transactions, from data 630b, for replication operations that do not. The marker 632 thus indicates the point relative to the replicating data 630 at which the file system 612 has assumed a consistent state.

At 820, once the marker 632 has been sent and its receipt confirmed, the first data storage system 116 unpauses the IO stack 140 to allow processing of IO request 112 to resume on the file system 612. Meanwhile, the second data storage system 416 continues to operate.

At 822, the second data storage system 416 receives the pending metadata transactions replicated during act 816 and applies the transactions to update the replica 652.

At 824, the second data storage system 416 receives the marker 632 sent from the first data storage system 116 at act 818. For example, the replication splitter 226 in the second data storage system 416 encounters the marker 632 as the second replication appliance 460 destages data from the buffer 462 to the IO stack 140.

At 826, and in response to receiving the marker 632, the second data storage system 416 pauses the IO stack 140 on the replica 652 at the point designated by the marker 632. Once all data 630a up to the point designated by the marker 632 has been applied to the replica 652, the file system image in the replica 652 has been made to assume a consistent state.

At 828, the second data storage system 416 generates the snap 654 of the replica 652. The file system image in the snap 654 thus also has a consistent state.

At 830, the second data storage system 416 unpauses the IO stack 140, so that replication operations may proceed, i.e., to apply data 630b. It should be understood that pausing and unpausing the IO stack 140, as described in acts 826 and 830, may be regarded as optional in system that do now require pausing to take snaps.

At 832, the second data storage system 416 mounts the snap 654 for local access. Hosts and administrators can access the snap 654 for reading and/or writing, such as to perform backup, to test disaster recovery, and/or to perform other activities.

Figure 10:
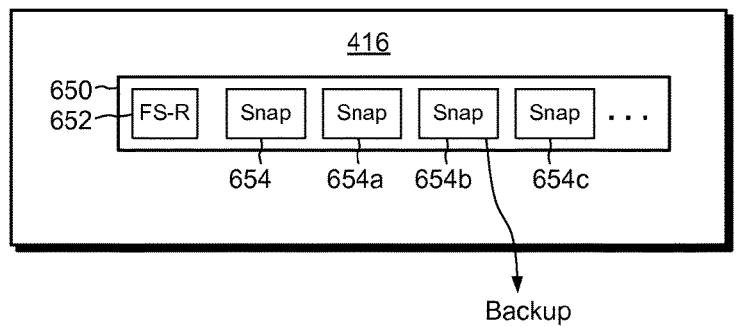
FIG. 10 is a block diagram showing example snaps of the replica on the second data storage system, any of which can be used to create a backup of the file system.

FIG. 10 shows an example arrangement for performing destination-directed backup by the second data storage system 416. Here, it is seen that, in addition to the snap 654 of the replica 652, additional snaps 654a, 654b, 654c, etc. have been taken. Each of the snaps 654 and 654a-c is generated at a different time and provides a respective point-in-time version of the file system 652. In an example, any of the snaps 654 and 654a-c may be the subject of a backup operation, in which the data of the respective snap is copied to a backup site. The backup site may be located within the data storage system 416 or elsewhere. In some examples, the lower-deck file system 650 retains only a single snap (the snap 654), which the second data storage system 416 may regularly refresh by taking new snaps of the replica 652 and deleting previous snaps. For each new snap taken, the second data storage system 416 ensures that the new snap contains a consistent file system image, e.g., by operation of the process 700 or the process 800.

Figure 11:
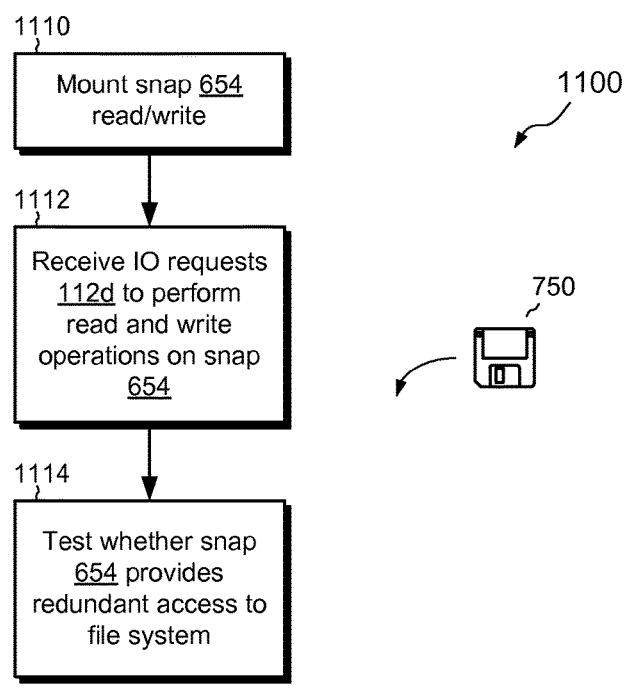
FIG. 11 is a flowchart showing an example process for testing disaster recovery procedures.

FIG. 11 shows an example process 1100 for testing disaster recovery. The process 1100 may be performed, for example, by the software constructs in the second data storage system 416.

At 1110, the second data storage system 416 mounts the snap 654 read/write. This act may be performed, for example, in response to a request received from an administrator and after the file system image in the snap 654 has been made to assume a consistent state.

At 1112, the second data storage system 1112 receives IO requests 112d to perform read and write operations on the snap 654. For example, an administrator may exercise the file system image in the snap 654 by reading and writing to the snap.

At 1114, the administrator tests whether the snap 654 can provide redundant access to the file system 612. For example, by exercising the file system image in the snap 654 through reading and writing operations, the administrator can assess whether the snap 654 can be relied upon to meet disaster recovery requirements, such as failover to the snap 654 or to the replica 652.

As the process 1100 is performed on the second data storage system 416 by accessing the snap 654 and without access to the replica 652, the process 1100 allows testing of disaster recovery without disrupting ongoing replication activities.

Figure 12:
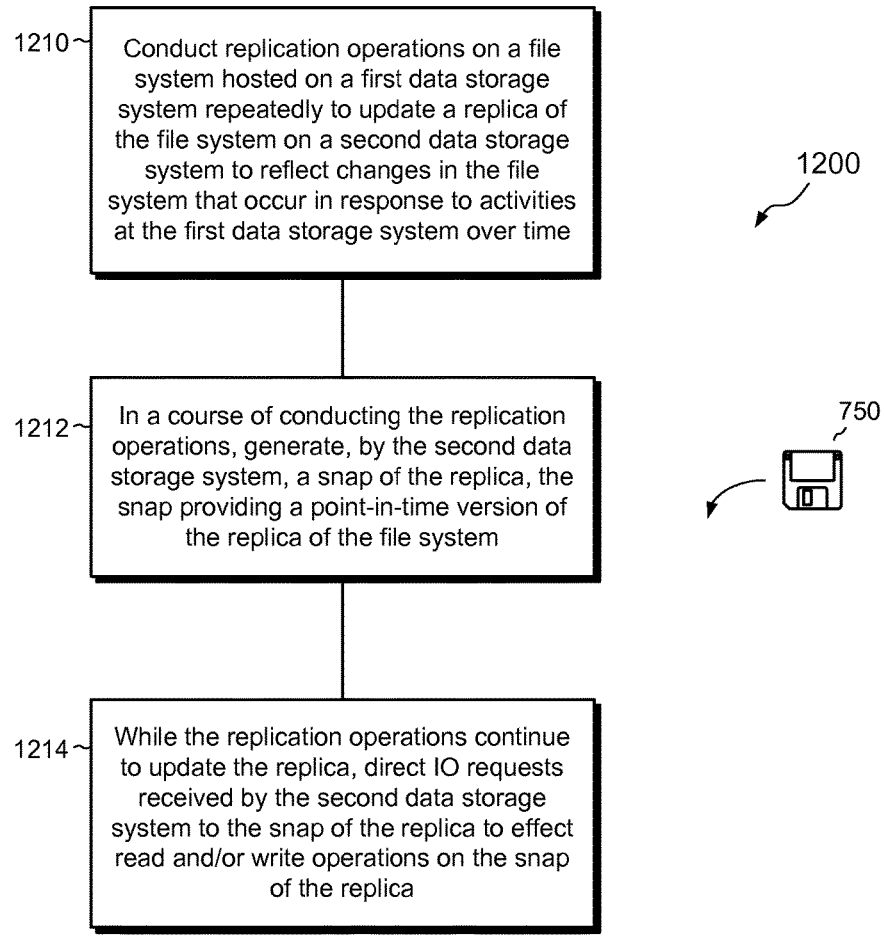
FIG. 12 is a flowchart showing an example process for accessing file system replicas.

FIG. 12 shows an example process 1200 for accessing file system replicas and provides a summary of many of the activities described above. The process 1200 may be carried out, for example, in connection with the data storage systems 116 and 416, such as by the software constructs described in connection with FIGS. 1-3, which reside in the memories 130 of respective storage processors 120 and are run by respective sets of processing units 124.

At 1210, replication operations are conducted on a file system hosted on a first data storage system repeatedly to update a replica of the file system on a second data storage system to reflect changes in the file system that occur in response to activities at the first data storage system over time. For example, the first and second data storage systems 116 and 416 conduct synchronous or asynchronous replication operations on the file system 612 (FIG. 6), which is hosted (i.e., served to hosts), on the first data storage system 116. Replication operations repeatedly update the replica 652 of the file system 612 on the second data storage system 416 to reflect changes in the file system 612 that occur over time in response to the first data storage system 116 processing IO requests 112 directed to the file system 612.

At 1212, in a course of conducting the replication operations, the second data storage system generates a snap of the replica. The snap provides a point-in-time version of the replica of the file system. For example, while the second data storage system 416 continues to update the replica 652 with data 630 to mirror changes made to the file system 612, the second data storage system 416 takes a snap 654 of the replica 652. The snap 654 provides a point-in-time version of the replica 652.

At 1214, while the replication operations continue to update the replica, IO requests received by the second data storage system are directed to the snap of the replica to effect read and/or write operations on the snap of the replica. For example, as the second data storage system 416 continues to update the replica 652 with data 630, the second data storage system 416 receives IO requests 112d. In some examples, the IO requests 112d include an FSID that specifies the replica 652, and the replicator 222 in the IO stack 140 replaces the FSID with that of the snap 654, thereby redirecting IO requests 112d to the snap 654. In other examples, the IO requests 112d specify the snap directly, and the second data storage system 416 merely directs the IO requests 112d to their designated object, i.e., to the snap 654.

An improved technique has been described that generates a snap (point-in-time version) of a replica on a destination site and provides access to the snap for reading and/or writing while replication operations on the replica continue to be performed. As the snap is a separate object from the replica itself, users may access the snap without affecting the replica or disturbing ongoing replication activities. Users can also mount the snap to perform destination-driven backup operations, to test disaster recovery, and/or to perform other activities.

Having described certain embodiments, numerous alternative embodiments or variations can be made. For example, although embodiments have been described for performing continuous replication with the aid of replication appliances 160/460 and replication splitters 226, this is merely an example, as the improvements hereof may be realized with any replication technology.

Also, while embodiments have been described for snapping replicas of file systems, the improvements hereof are not limited to file systems and may be enjoyed with other types of data objects, such as LUNs and vVols, for example.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 750 in FIGS. 7, 8, 11, and 12). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments. In addition, the word "set" as used herein indicates one or more of something, unless a statement is made to the contrary.

Those skilled in the art will therefore understand that various changes in form and detail may be made to the embodiments disclosed herein without departing from the scope of the invention.

What is claimed is:

1. A method of accessing file system replicas, the method comprising:
   conducting replication operations on a file system hosted on a first data storage system repeatedly to update a replica of the file system on a second data storage system to reflect changes in the file system that occur in response to activities at the first data storage system over time;
   in a course of conducting the replication operations, generating, by the second data storage system, a snap of the replica, the snap providing a point-in-time version of the replica of the file system; and
   while the replication operations continue to update the replica, directing IO requests received by the second data storage system to the snap of the replica to effect read and/or write operations on the snap of the replica;
   wherein conducting the replication operations includes performing discrete update operations on the replica to keep the replica current with changes made to the file system, wherein the first data storage system has a transaction log for storing pending metadata transactions for the file system, and wherein the method further comprises, prior to the second data storage system generating the snap:
      the first data storage system applying the pending metadata transactions from the transaction log to the file system; and
      after applying the pending metadata changes to the file system, the first data storage system sending a marker to the second data storage system, the marker identifying a point relative to the discrete update operations at which the pending metadata changes have been applied to the file system,
   wherein generating the snap by the second data storage system is performed only after the second data storage system has received the marker.

2. The method of claim 1, wherein the method further comprises:
   realizing the file system in a form of a container file stored in an internal file system in the first data storage system,
   realizing the replica in a form of a first container file stored in an internal file system in the second data storage system; and
   realizing the snap of the replica in a form of a second container file stored in the internal file system in the second data storage system.

3. The method of claim 2, wherein the method further comprises, prior to directing the IO requests to the snap, the second data storage system applying the pending metadata transactions from the transaction log to the snap to generate a consistent image of the file system in the snap.

4. The method of claim 3, further comprising realizing the transaction log as an embedded transaction log embedded within the file system,
   wherein the replica and the snap on the second data storage system each include a version of the embedded transaction log, and wherein applying the pending transactions from the transaction log to the snap includes reading the pending transactions from embedded transaction log in the snap and applying the pending transactions to the point-in-time version of the replica of the file system in the snap to generate the consistent image of the file system in the snap.

5. The method of claim 3, further comprising:
   realizing the transaction log in a second container file in the internal file system in the first data storage system; and
   forming a consistency group that includes both the first container file and the second container file in the internal file system in the first data storage system, wherein conducting the replication operations includes performing operations on the consistency group to generate both the replica of the file system and a replica of the transaction log, and wherein applying the pending transactions from the transaction log to the snap includes reading the pending transactions from the replica of the transaction log and applying the pending transactions to the point-in-time version of the replica of the file system to generate the consistent image of the file system in the snap.

6. The method of claim 2, wherein the method further comprises generating, by the second data storage system, additional snaps of the replica, each additional snap providing a respective point-in-time version of the replica of the file system at a respective point in time.

7. The method of claim 6, further comprising, after generating each additional snap of the file system, (i) applying all pending metadata transactions from the transaction log to the additional snap and (ii) deleting the immediately preceding snap.

8. The method of claim 6, further comprising the second data storage system directing a backup copy to be made of any of the snap and the additional snaps.

9. The method of claim 2, wherein directing the IO requests to the snap includes directing both read and write IO requests to the snap to effect read and write operations on the snap, respectively, wherein at least some of the IO requests are part of a test of the replica to assess whether the replica can provide hosts with access to the file system in an event that the first data storage system is unable to provide access to the file system.

10. The method of claim 2, wherein the replication operations include continuous replication operations that mirror respective IO requests directed to the file system to the replica, wherein the IO requests are grouped into bunches, each bunch including multiple consecutive IO requests, and wherein generating the snap is performed only after applying all IO requests in a bunch to the replica and before applying any IO requests in any subsequent bunch to the replica.

11. A system comprising a first data storage system and a second data storage system coupled to the first data storage system, the first data storage system and the second data storage system each including a respective set of processors and memory, the system constructed and arranged to:

conduct replication operations on a file system hosted on the first data storage system repeatedly to update a replica of the file system on the second data storage system to reflect changes in the file system that occur in response to activities at the first data storage system over time;

in a course of conducting the replication operations, generate, by the second data storage system, a snap of the replica, the snap providing a point-in-time version of the replica of the file system; and while the replication operations continue to update the replica, direct 10 requests received by the second data storage system to the snap of the replica to effect read and/or write operations on the snap of the replica, wherein the first data storage system has a transaction log for storing pending metadata transactions for the file system, wherein, when constructed and arranged to conduct the replication operations, system is further constructed and arranged to perform discrete update operations on the replica to keep the replica current with changes made to the file system, and wherein the system is further constructed and arranged to, prior to the second data storage system generating the snap:

apply, by the first data storage system, the pending metadata transactions from the transaction log to the file system; and after applying the pending metadata changes to the file system, send, by the first data storage system, a marker to the second data storage system, the marker identifying a point relative to the discrete update operations at which the pending metadata changes have been applied to the file system, wherein the system is constructed and arranged to generate the snap by the second data storage system only after the second data storage system has received the marker.

12. The system of claim 11, wherein the system is further constructed and arranged to, prior to directing the IO requests to the snap, apply the pending metadata transactions from the transaction log to the snap to generate a consistent image of the file system in the snap.

13. A computer program product including a set of non-transitory, computer-readable media having instructions which, when executed by one or more processors, cause the processors to perform a method of accessing file system replicas, the method comprising:

conducting replication operations on a file system hosted on a first data storage system repeatedly to update a replica of the file system on a second data storage system to reflect changes in the file system that occur in response to activities at the first data storage system over time;

in a course of conducting the replication operations, generating, by the second data storage system, a snap of the replica, the snap providing a point-in-time version of the replica of the file system; and while the replication operations continue to update the replica, directing 10 requests received by the second data storage system to the snap of the replica to effect read and/or write operations on the snap of the replica, wherein the first data storage system has a transaction log for storing pending metadata transactions for the file system, wherein conducting the replication operations includes performing discrete update operations on the replica to keep the replica current with changes made to the file system, and wherein the method further comprises, prior to the second data storage system generating the snap:

the first data storage system applying the pending metadata transactions from the transaction log to the file system; and after applying the pending metadata changes to the file system, the first data storage system sending a marker to the second data storage system, the marker identifying a point relative to the discrete update operations at which the pending metadata changes have been applied to the file system, wherein generating the snap by the second data storage system is performed only after the second data storage system has received the marker.

14. The computer program product of claim 13, wherein the method further comprises, prior to directing the IO requests to the snap, applying the pending metadata transactions from the transaction log to the snap to generate a consistent image of the file system in the snap.

15. The method of claim 1, wherein the first data storage system is coupled to the second data storage system over a network, and wherein the first data storage system and the second data storage system each include a respective set of processing units and memory.

* * * * *